Figure 1:
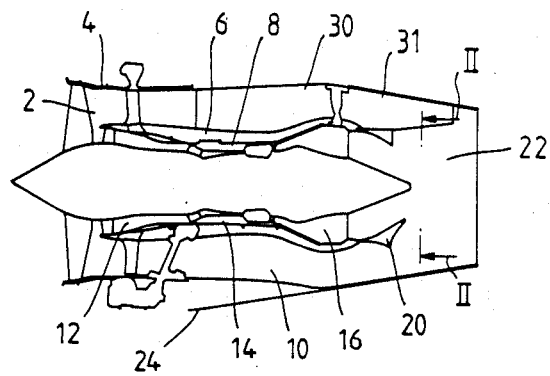

United States Patent [19]

Braithwaite

[11] Patent Number: 4,813,230
[45] Date of Patent: Mar. 21, 1989

[54] GAS TURBINE NOZZLES

[75] Inventor: Anthony Braithwaite, Nottingham, England

[73] Assignee: Rolls-Royce plc, London, England

[21] Appl. No.: 99,873

[22] Filed: Sep. 22, 1987

[30] Foreign Application Priority Data

Aug. 26, 1987 [GB] United Kingdom ............... 8720113

[51] Int. Cl.[4] .......................... F02K 1/46; F02K 3/04
[52] U.S. Cl. ........................... 60/262; 181/220; 29/157 C
[58] Field of Search ................. 60/262, 263, 264, 271; 181/220; 239/265.17, 127.3; 29/157 C

[56] References Cited

U.S. PATENT DOCUMENTS 3,508,403 4/1970 Neitzel ................................. 60/262
4,117,671 10/1978 Neal et al. ........................... 60/262
4,302,934 12/1981 Wynosky et al. .................... 60/262

FOREIGN PATENT DOCUMENTS 996461 6/1965 United Kingdom .
2015086 9/1979 United Kingdom .
2085088 4/1982 United Kingdom .

Primary Examiner—Donald E. Stout
Attorney, Agent, or Firm—Cushman, Darby & Cushman

[57] ABSTRACT

A bypass gas turbine has a mixer nozzle at the turbine outlet with a main body, of lobed cross-section to promote mixing of the turbine gas flow and the bypass flow. For a transition at the forward end of the nozzle from the essentially circular boundary between the two flows preceding the turbine outlet to said lobed form, there is an annular connecting ring fairing a channel section with radially inner and outer flanges to which the forward end of the fabricated main body is secured at the peaks and troughs of its lobes. Fairing elements are secured to the flanges to blend with the lobed form of the nozzle body. Because the nozzle body has a lobed form along its entire length it can be constructed as a single skin fabrication while retaining sufficient stiffness to prevent unacceptable deformations from the pressure forces on it under reverse thrust conditions.

10 Claims, 3 Drawing Sheets

GAS TURBINE NOZZLES

This invention relates to bypass gas turbine engines and is concerned with mixer nozzles for the exhaust flows from such engines. Mixer nozzles are employed to promote forced mixing of the hot turbine exhaust gases with the relatively cool bypass flow in order to improve engine performance and specific fuel consumption. Such mixer nozzles are known having a lobed or chuted configuration so as to provide an extended interface for the mixing of the two gas flows so as to intensify the mixing process.

Considerable pressure differences are experienced by a mixer nozzle under certain flight conditions, and more especially for an engine equipped with thrust reversal means, when those means are put into operation. These pressure differences load the nozzle structure and have their maximum effect at the leading or entry end of the nozzle. However it is at the entry end that the lobed configuration, which has a substantial degree of stiffness, must be suppressed in order to blend with the essentially annular gas passages that exist immediately upstream of the nozzle. The result in that, while it would be desirable to fabricate the nozzle as a single skin structure for considerations of lightness, it may be impossible or impractical to employ such a structure because of the deflections that would occur in the leading region under conditions of maximum pressure difference.

It is an object of the present invention to provide a nozzle assembly that can avoid this difficulty so that a main body of nozzle can be constructed as a single skin fabrication.

According to the invention, there is provided a bypass gas turbine engine having a hot gas exhaust outlet in which an inner mixer nozzle is located for mixing the exit gas flows from the turbine passages and from a bypass passage surrounding the turbine passages and separated therefrom by an essentially circular cross-section boundary, the mixer nozzle having a lobed configuration to promote mixing of the gas flows and along its length providing a progressive transition from the said circular boundary to said lobed configuration, the mixer nozzle comprising a main body formed by a single skin fabrication having the lobed configuration extending over its length with the depths of the lobes increasing from a relatively shallow cross-section at its forward end, said nozzle body being mounted onto the turbine outlet through an annular connecting member having radially spaced inner and outer faces to which the nozzle body is secured through inner and outer regions respectively of the lobes at its forward end, and fairing means between said connecting member and the nozzle body providing a transition between the annular format the entry end of the nozzle and the lobed form of said nozzle body further downstream.

Conveniently, the connecting member comprises a channel section with respective annular flanges providing said inner and outer faces. In this case, preferably at said forward end of the nozzle body the cross-sectional form of the lobes is modified to provide radially inner and outer lands conforming to the radii of said inner and outer flanges of the connecting member and through which the body is secured to the connecting member.

In a preferred construction, the fairing means comprise plates extending in cantilever manner from said inner and outer faces of the annular connecting member. It is possible to provide such plates in a simple manner as separate fairing elements for the individual lobes of the mixer nozzle.

Figure 2:
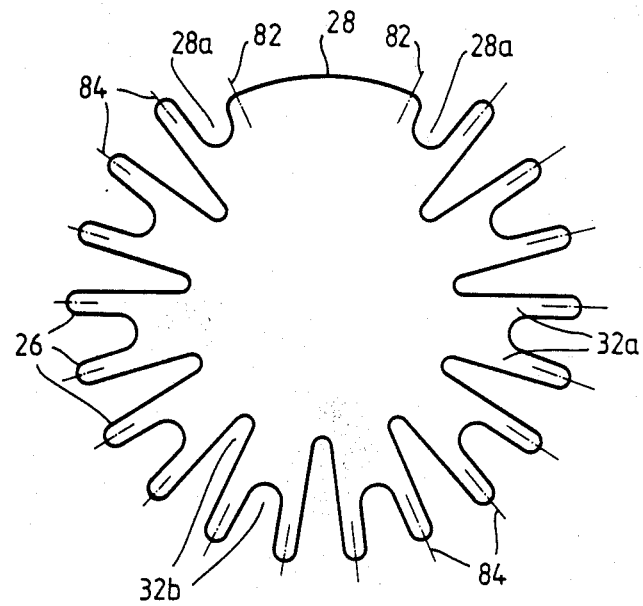
Figure 3:
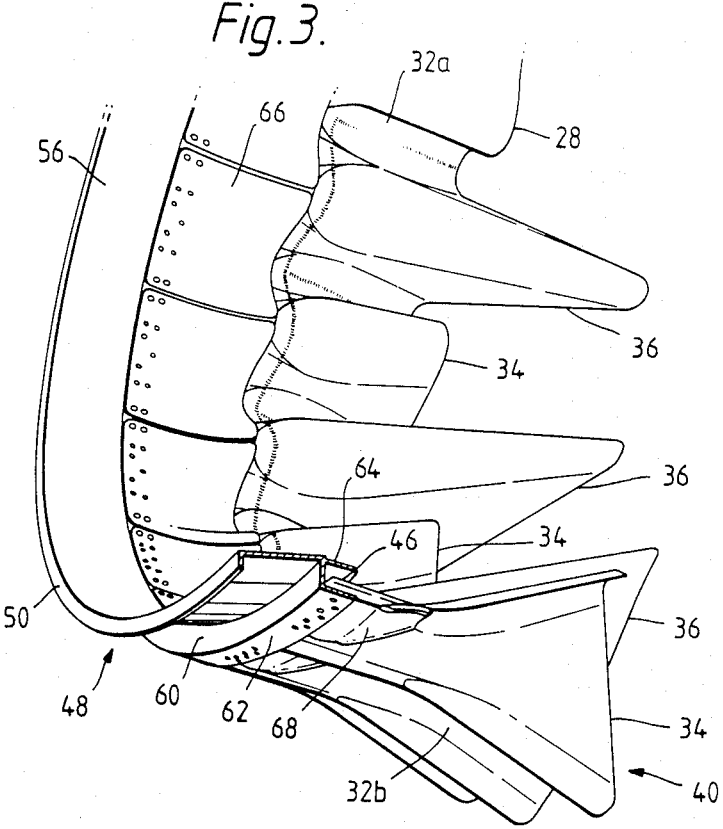
Figure 5:
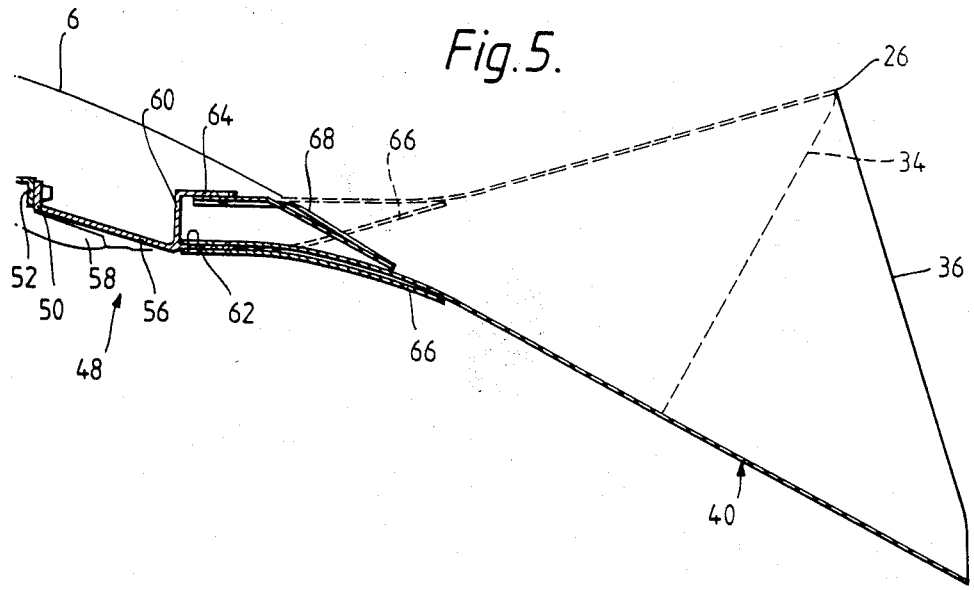
Figure 4:
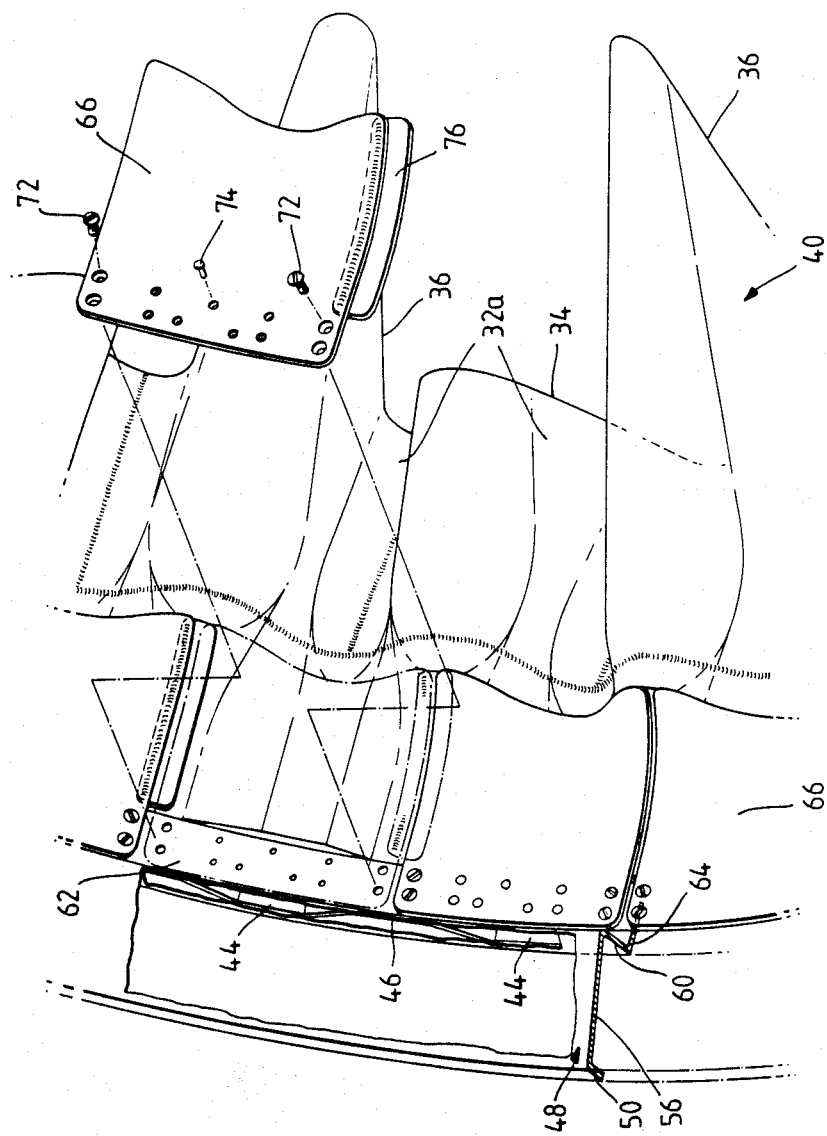

By way of example, one form of mixer nozzle construction according to the invention will be described in more detail with reference to the accompanying drawings, in which:

FIG. 1 is an outline sectional view of a bypass gas turbine engine provided with the mixer nozzle, FIG. 2 is a schematic illustration of the lobed configuration at the rear of the mixer nozzle as seen in the direction II—II in FIG. 1, FIG. 3 is a partial perspective view of the mixer nozzle, FIG. 4 is a view of a larger scale illustrating in more detail the junction between the connection member and the main body of the nozzle and the mounting of the inner fairing tiles, and FIG. 5 is a diagrammatic cross-sectional view of the mixer nozzle and its attachment to the rear of the engine section.

In the schematic illustration of FIG. 1, there is shown a gas turbine engine of generally conventional form. Air flows through the front intake 2 of an outer casing 4 and, following the intake an inner casing 6 divides the incoming air between inner and outer passages 8, 10. Within the inner casing 6 the inner passage 8 passes through compressor, combustion chamber and turbine sections 12, 14, 16 respectively. The annular passage 10 between the inner casing and the outer casing contains a bypass air flow that mixes with the hot turbine exhaust gas at an internal mixer nozzle 20. The combined flows then finally exit through an exhaust section 22 of the outer casing which also forms the rear-most part of the engine nacelle 24.

The mixer nozzle 20 is mounted on the inner casing 6. From a circular form at its inlet end its cross-section changes progressively to a deeply lobed form shown most clearly in FIG. 2, with a series of eighteen lobes 26 equally spaced around the major part of its circumference, this pattern being interrupted at the top of the nozzle where there is a wider shallow lobe 28 which mates with upper splitter and "pen nib" fairings 30 and 31 respectively that enclose a rear mounting member of the engine. The main series of lobes define inner and outer series 32a, and 32b of progressive deepening gulleys or chutes for the two gas flows. The external series of gulleys 32b appear with alternate shallower and deeper profiles in the rear view of FIG. 2 because, as seen in FIGS. 3 to 5, between alternate pairs of lobes 26 the gulleys are relatively short, terminating at rear edges 34 which are scarfed forwards from the adjoining pair of lobes. In contrast, the deeper gulleys extend beyond their adjoining pair of lobes with rearwardly scarfed rear edges 36 that taper inwards.

The lobed configuration is formed in a main body 40 of the mixer nozzle which is constructed as a single skin fabrication of 1.2 mm heat resisting nickel steel pressings welded together. The lobes 26 extend along the full length of this welded assembly although they have a modified rather shallow section at the forward end. At this end, best seen in FIGS. 4 and 5, the curvilinear peaks and gulleys of the lobes merge into trapezoidal-like corrugations comprising inner and outer lands 44, 46 which have arcuate faces concentric with the central axis of the nozzle.

The welded assembly of the nozzle main body 40 is secured to a machined titanium connecting ring 48 at the forwared end of the mixer nozzle. The ring consists of a front radial flange 50 that is bolted to the inner casing 6 at a rear flange 52 of the low-pressure turbine exhaust, a rearwardly extending web 56 which, with the flanges 50 and 52, is screened from the turbine exhaust flow by an exit sleeve 58, and a rear-most channel section 60 with radially inner and outer flanges 62, 64.

The forward end of the main body 40 is inserted in the channel section, the inner and outer lands 44, 46, at this region of the main body being in face to face contact with the internal surfaces of the flanges 62, 64, and the adaptor ring and main body being bolted together at these areas of contact.

Rigidity in this region of the mixer nozzle is obtained both by the maintenance of the convoluted configuration of the single-skin main body 40 to its forward end and also by the reinforcement the fabrication obtains in this region from the channel section 60 of the connecting ring. The welded fabrication immediately adjacent the joint thus has a large moment of section from its lobes and their connection to the flanges 62, 64 of the connecting ring despite the relatively thin sheet material from which it is constructed. It should also be noted that its attachment at the spaced inner and outer lands 44, 46 to the connecting ring gives freedom for relative thermal expansion between the nozzle main body and the ring.

To avoid disturbance of the gas flows in the inner and outer passages 8, 10 as they reach the lobed fabrication, fairings, produced as pressings of the same material as the main nozzle body, are secured to the regions of the connector flanges 62, 64 coincident with the gulleys of the lobed nozzle body cross-section at its forward end. Apart from the region of the wide shallow lobe 28 at the top of the mixer nozzle, these fairings are in the form of plates or tiles, one to each gulley of the lobed cross-section. Illustrated in the drawings are inner and outer tiles, 66, 68 respectively of the main series of these plates or tiles, for the gulleys that are formed by the lobes 26, suitably modified further tiles being provided for the differently shaped gulleys formed on the interior of the wider top lobe 28 and the two gulleys 28a to each side of that lobe.

The tiles are secured only at their front edges where they overlap the connecting ring flanges 62, 64, in the gaps that occur at each flange between succeeding lands 44, 46 of the main body, by screws and rivets 72, 74 through these flanges. The inner flange 62 is stepped radially outwards from the adjacent edge of the web 56, so that the internal tiles 66, mounted on the radially inner face of the flange 62, form an essentially continuous surface with the radially inner face of the web. Each internal tile 66, as shown more clearly in FIG. 4, has a lap strip 76 welded to the back of one side edge to project laterally from that edge and be overlapped by the adjacent edge of the adjoining tile 66. At the contact faces between the tiles 66 and the lap strips 76 it may be preferred to apply a metal facing, e.g. of tungsten carbide/cobalt. Because the outer flange 64 of the connecting ring is overlapped by the rear end of the inner casing 6, the outer tiles 68 are separated by the lobes 26 at the point at which they are exposed to the bypass air flow. They therefore do not require lapstrips but one or both of the adjoining surfaces between them and the fabricated main body 40 may have similar hard metal facings.

FIGS. 3 to 5 illustrate in particular how the inner tiles are given a transverse cross-section with a curvature that increases continuously toward their trailing edges, so that each tile curves outwards to blend with the internal gulley defined by its associated lobe 26 while its lateral edges incline radially inwards to follow the roots of the lobe that form the adjacent external gulley. These figures also show how the outer tiles 68, initially shrouded by the engine inner casing, are given an increasingly curved transverse cross-section towards their rear to provide a transition between the outer surface of the inner casing and the outer faces of the gulleys between the lobes 26.

Circumferential junction positions 83,84, indicated in FIG. 2, illustrate how the mixer nozzle fabrication may be produced from a series of four different forms of pressing, namely one wide lobe pressing for the top of the nozzle between junctions 82 left-hand and right-hand, gulley-like pressings between junctions 82, 84 adjoining each side of the wide top lobe 28 and extending as far as the peak of the first of the main series of lobes on each side of that top lobe, and a series of seventeen common gulley/lobe pressings each between a pair of adjacent junctions 84 at the peaks of the lobes, for the main series of lobes, nine of these being deep and rearwardly scarfed to end at the rear edges 36 of the nozzle and eight being shallow and forwardly scarfed to end at the rear edges 34.

Other fabrication layouts can be employed; for example, it is possible to modify the layout described by further sub-dividing it circumferentially into a large series of smaller pressings so that there are also weld junctions along the sides of the gulleys between the lobes, and/or by providing separate front and rear parts for each of the pressings so that front and rear sub-assemblies are built up and are joined together by a circumferential weld. It is, of course also possible to construct other, lobed configurations than the one illustrated. Whichever layout is employed, it is imortant to ensure that a good fit is obtained in the interface where the nozzle is joined to the adaptor ring flanges in order to control the fastener loadings there.

I claim:

1. A bypass gas turbine engine having a hot gas exhaust outlet for exit gas flows from turbine passages and a bypass passage in which an inner mixer nozzle is located for mixing the exit gas flows from the turbine passages and from a bypass passage surrounding the turbine passages, the turbine and bypass passages being separated by an essentially annular boundary wall, the mixer nozzle having a lobed configuration to promote mixing of the gas flows and, along its length, providing a progressive transition from said annular boundary wall to said lobed configuration, the mixer nozzle comprising a main body formed by a single skin fabrication having said lobed configuration extending over its length with the depth of the lobes increasing from a relatively shallow form at its forward end, said nozzle body being mounted onto the turbine outlet through an annular connecting member having radially spaced inner and outer faces, said forward end of said main body having circumferentially alternating inner and outer portions with the said inner portions being secured to said inner face of said annular connecting member and said outer portions of said main body being secured to said outer face of said annular connecting member, and fairing means between said connection member and the nozzle body providing a transition between said annular boundary wall at the entry end of the nozzle and the lobed configuration of said nozzle body further downstream.

2. An engine according to claim 1 wherein the connecting member comprises a channel section with respective annular flanges providing said inner and outer faces.

3. An engine according to claim 2 wherein at said forward end of said nozzle body the cross-sectional form of said lobed configuration provides radially inner and outer lands conforming to the radii of said inner and outer faces of the annular connecting member and through which the nozzle body is secured to the annular connecting member.

4. An engine according to any one of claims 1 to 3 wherein said fairing means comprise members extending in cantilever manner from the connecting member inner and outer faces.

5. An engine according to claim 4 wherein hard metal facings are provided on areas of the fairing means rearwards of the connecting member inner and outer faces in contact with adjoining surfaces of the nozzle.

6. An engine according to claims 1, 2 or 3 wherein the individual lobes of the nozzle are provided with separate fairing elements.

7. An engine according to claim 6 wherein on the inner face of the nozzle, at least some of said fairing elements overlap each other.

8. An engine according to claim 6 wherein at least one of said connecting member inner and outer faces is overlapped by a rearmost portion of said boundary wall and the fairing elements are spaced from each other on said at least one face.

9. An engine according to claims 1, 2 or 3 wherein the nozzle body is composed of sheet-metal pressings welded together with junctions that extent longitudinally of the nozzle at or adjacent the outer diameter of its lobes.

10. An engine according to claims 1, 2 or 3 wherein the nozzle body is composed of sheet metal pressings welded together at a circumferential junction intermediate the length of the nozzle.

* * * * *